(12) United States Patent  (10) Patent No.: US 6,629,491 B1
Chan                              (45) Date of Patent:       Oct. 7, 2003

(54) COOKING APPLIANCE

(75) Inventor: Wing-Po Chan, Hong Kong (HK)

(73) Assignee: Chiaphua Industries Limited, Hong Kong (HK)

( * ) Notice: Subject to any disclaimer, the term of this patent is extended or adjusted under 35 U.S.C. 154(b) by 0 days.

(21) Appl. No.: 10/317,941

(22) Filed: Dec. 12, 2002

(51) Int. Cl.[7] ............... A23L 1/00; A21B 1/00; A47J 27/10; A21D 8/00; B01F 7/00
(52) U.S. Cl. ............ 99/331; 99/348; 366/145; 366/146; 366/185; 366/279; 366/285
(58) Field of Search ............... 99/326–333, 337, 99/338, 348, 352–355, 341, 468; 366/144–146, 149, 185, 279, 285, 215, 210–214, 601; 219/621, 620, 627, 652

(56) References Cited

U.S. PATENT DOCUMENTS

| | | | | |
|---|---|---|---|---|
| 4,100,613 A | * | 7/1978 | Shaeffer | 366/185 X |
| 4,693,610 A | * | 9/1987 | Weiss | 99/348 X |
| 4,779,522 A | * | 10/1988 | Wong | 99/348 |
| 4,878,627 A | * | 11/1989 | Otto | 99/348 X |
| 4,901,633 A | * | 2/1990 | De Longhi | 99/348 X |
| 5,176,069 A | * | 1/1993 | Chen | 366/144 X |
| 5,228,381 A | * | 7/1993 | Virgilio et al. | 99/331 |
| 5,233,916 A | * | 8/1993 | Butler et al. | 99/348 X |
| 5,372,422 A | * | 12/1994 | Dubroy | 99/348 X |
| 5,386,102 A | * | 1/1995 | Takikawa et al. | 99/348 X |
| 5,524,530 A | * | 6/1996 | Nijzingh et al. | 99/348 X |
| 6,026,735 A | * | 2/2000 | Waterworth | 366/146 X |
| 6,113,966 A | * | 9/2000 | Belongia et al. | 99/331 X |

* cited by examiner

Primary Examiner—Timothy F. Simone
(74) Attorney, Agent, or Firm—Jackson Walker L.L.P.

(57) ABSTRACT

A cooking appliance includes a cooking vessel to receive ingredients to be heated, stirred and cooked, an electric heater associated with the cooking vessel to heat the ingredients, and a drive motor and stirring blade. The appliance also includes provision for maintaining a tilted configuration of the cooking vessel during cooking and stirring. The appliance is particularly suited to unattended cooking of stir-fry and also for stirring of sauces and soup.

14 Claims, 5 Drawing Sheets

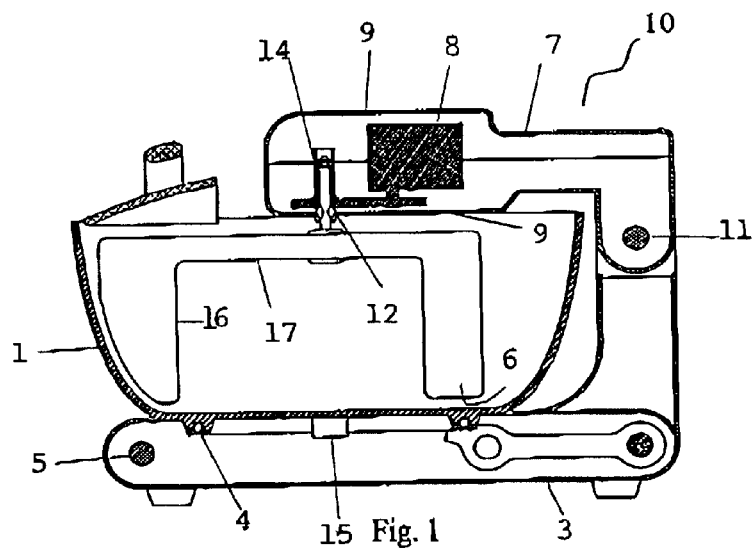
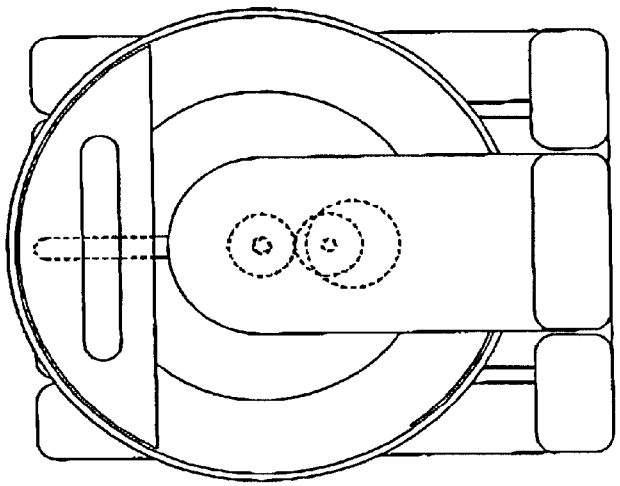
Fig. 2
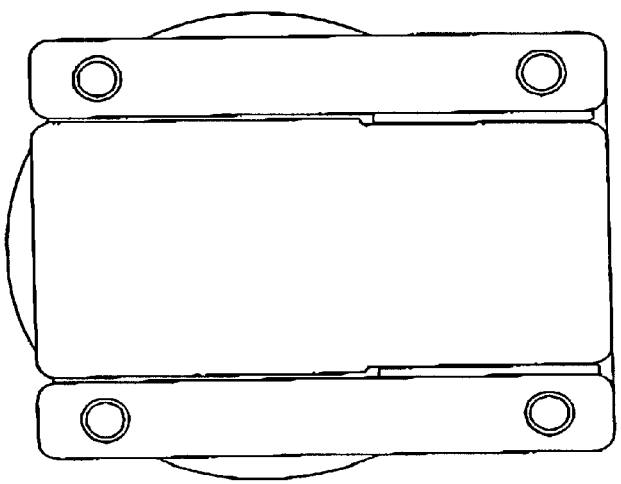
Fig. 3

COOKING APPLIANCE

BACKGROUND OF THE INVENTION

The present invention relates to cooking appliances. More particularly, although not exclusively, the invention relates to a stirring cooker that can be left unattended to cook and stir a variety of foods but particularly stir-fry.

The usual method of cooking stir-fry is to place oil in a pan, heat, then place ingredients one by one into the pan, stirring constantly with a spoon, spatula or other stirring implement to ensure that the ingredients cook evenly without burning.

Sometimes the stirring will be suspended while the cook attends to other tasks. In even the shortest of periods away, the mixture can become burnt and un-palatable.

OBJECTS OF THE INVENTION

It is an object of the present invention to provide a cooking appliance, which stirs the food automatically while cooking to thereby reduce the likelihood of the food burning even if left unattended for a prolonged period of time.

It is a further object of the present invention to provide an improved food-processing appliance.

DISCLOSURE OF THE INVENTION

There is disclosed herein a cooking appliance comprising:

a base, an intermediate member mounted movably upon the base, a cooking vessel supported either directly or indirectly by the base, a heater for heating the cooking vessel, an arm mounted movably upon the intermediate member, stirring means extending from the arm to be received within the cooking vessel, wherein during heating of the cooking vessel by the heater and/or stirring of any contents therein by the stirring means, the cooking vessel can be in a tilted configuration supported by the intermediate member.

Preferably the intermediate member is mounted pivotally to the base.

Preferably the arm is attached pivotally to the intermediate member.

Preferably the intermediate member and arm are configured to define a pivotal limit of the arm with respect to the intermediate member.

Preferably the appliance further comprises a linkage extending between the base and the intermediate member for maintaining the intermediate member in an inclined configuration when desired.

Preferably the linkage is an over-center linkage.

Preferably the appliance further comprises a lid that partially covers the cooking vessel.

Preferably the lid is positioned upon a rim of the cooking vessel at a position that is lower-most when the cooking vessel is tilted.

Preferably the heater has associated with it a thermostatic switch to deactivate the heater upon reaching a pre-set temperature.

Preferably the appliance further comprises control means for governing operation of the motor and/or heater.

Preferably the motor is mounted within the arm.

Preferably the appliance further comprises controls mounted on the arm.

Preferably the stirring means comprises a stirring blade and the arm has two pivotal limits defined by a lock or detent at each pivotal extremes one for cooking and another providing access to the stirring blade and to facilitate removal of the vessel.

Preferably the appliance has associated with the drive means a control circuit that is programmed to provide power to the motor and/or the heater.

Preferably the stirring blade is attached to the arm by a quick-release drive coupling.

BRIEF DESCRIPTION OF THE DRAWINGS

A preferred form of the present invention will now be described by way of example with reference to the accompanying drawings, wherein;

FIG. 1 is a schematic cross-sectional elevational view of the cooking appliance having it's cooking vessel positioned horizontally, with the stirring blade in a lowered (operating) position, FIG. 2 is a schematic plan view of the cooking appliance of FIG. 1 with the stirring blade in the lowered (operating) position, FIG. 3 is a schematic inverted plan view of the cooking appliance of FIGS. 1 and 2.

DESCRIPTION OF THE PREFERRED EMBODIMENT

Figure 4:
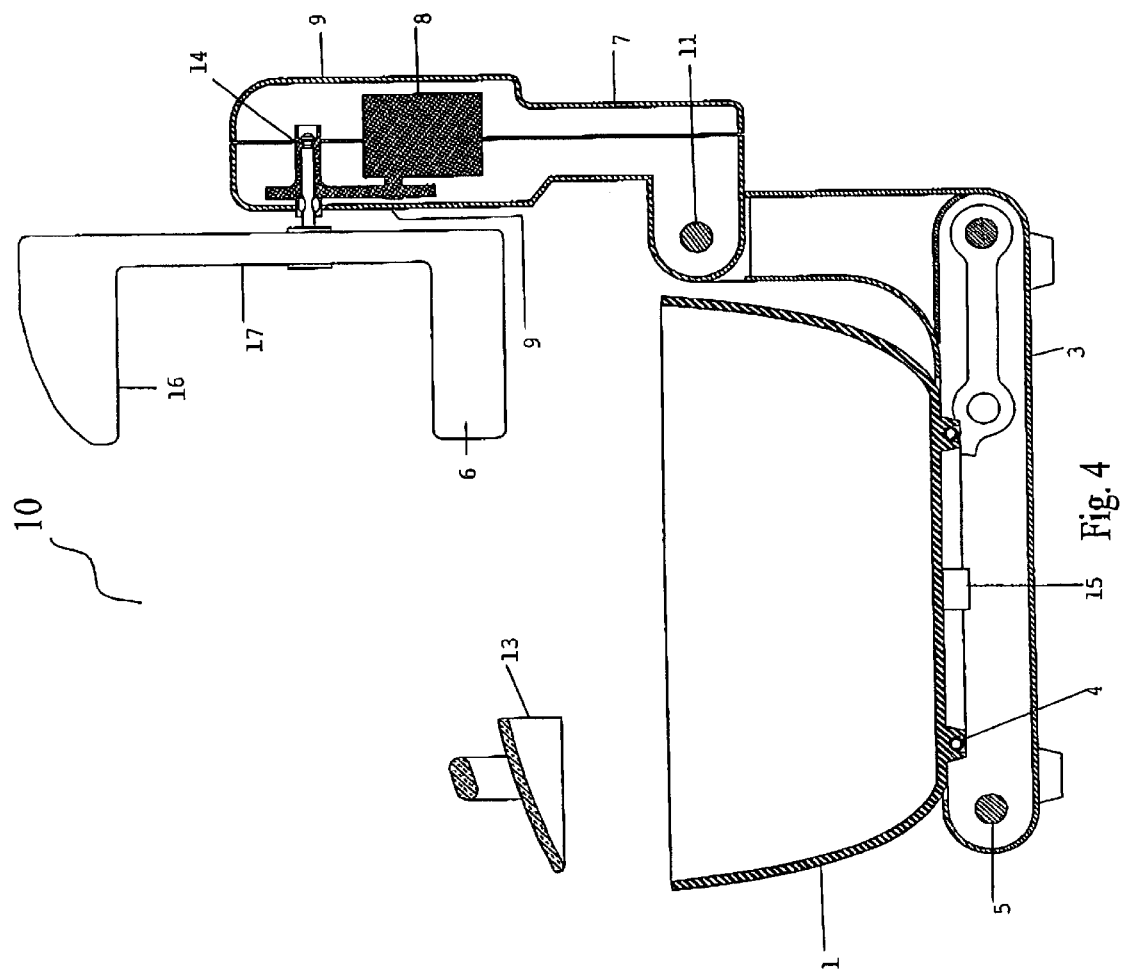
FIG. 4 is a schematic cross-sectional elevational view of a cooking appliance having it's cooking vessel positioned horizontal, with the stirring blade in a raised position.

In the accompanying drawings there is schematically depicted a cooking appliance 10. The cooking appliance 10 includes a base 3 including a hinge 5 to pivot an intermediate member 2, which in turn supports a cooking vessel 1. The base 3 and intermediate member 2 might be formed of plastics, ceramic or metallic material for example, whereas the cooking vessel 1 might be formed of aluminum, stainless steel or other heat-conducting waterproof material.

Partially or fully covering the cooking vessel 1 is a lid 13 that would typically be formed of glass, polycarbonate or other heat resistant material that is light-transmissive and preferably transparent.

Figure 5:
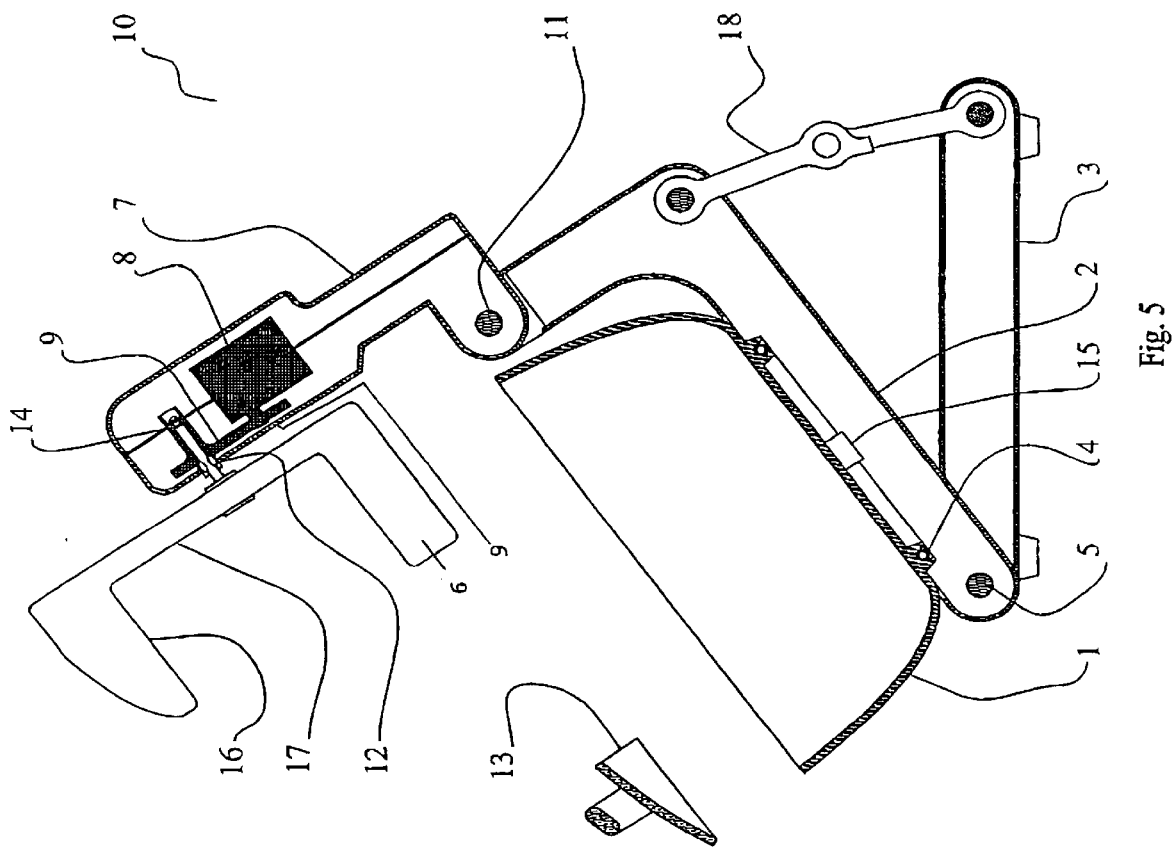
FIG. 5 is a schematic cross-sectional elevational view of a cooking appliance having it's cooking vessel positioned at an angle to the horizontal, with the stirring blade in the raised position.

An over-center linkage 18 for supporting the intermediate member 2 in the raised position as depicted in FIGS. 5 provides stable support for the inclined intermediate member 2.

An electric heating element 4 is fixed to the underside of the cooking vessel 1.

An arm 7 is attached to the intermediate member 2 at a hinge 11. Interengaging parts of the arm 7 and intermediate member 2 at the hinge 11 are configured to limit both upward and downward pivotal movement of the arm with respect to the intermediate member. In the raised end-of-limit configuration as depicted in FIGS. 4 and 5 for example, the arm 7 is locked against a detent or other locking device at or adjacent to the hinge 11.

An electric motor 8 and drivetrain 9 are housed within the arm 7. The drivetrain 9 incorporates a quick-release coupling 14. A shaft 12 of a stirring blade 6 is attached to the quick-release coupling 14 for receiving output of the motor 18 via the drivetrain 9.

A thermostatic sensor switch or switches 15 is/are attached to the bottom of the cooking vessel 1. The sensor switch or switches might comprise an over-temperature sensor and are associated with a control circuit (not shown) that might be positioned within arm 7 for example. A thermister or other alternative device might be substituted for the sensor switch(s) 15 and the over temperature switch.

Figure 6:
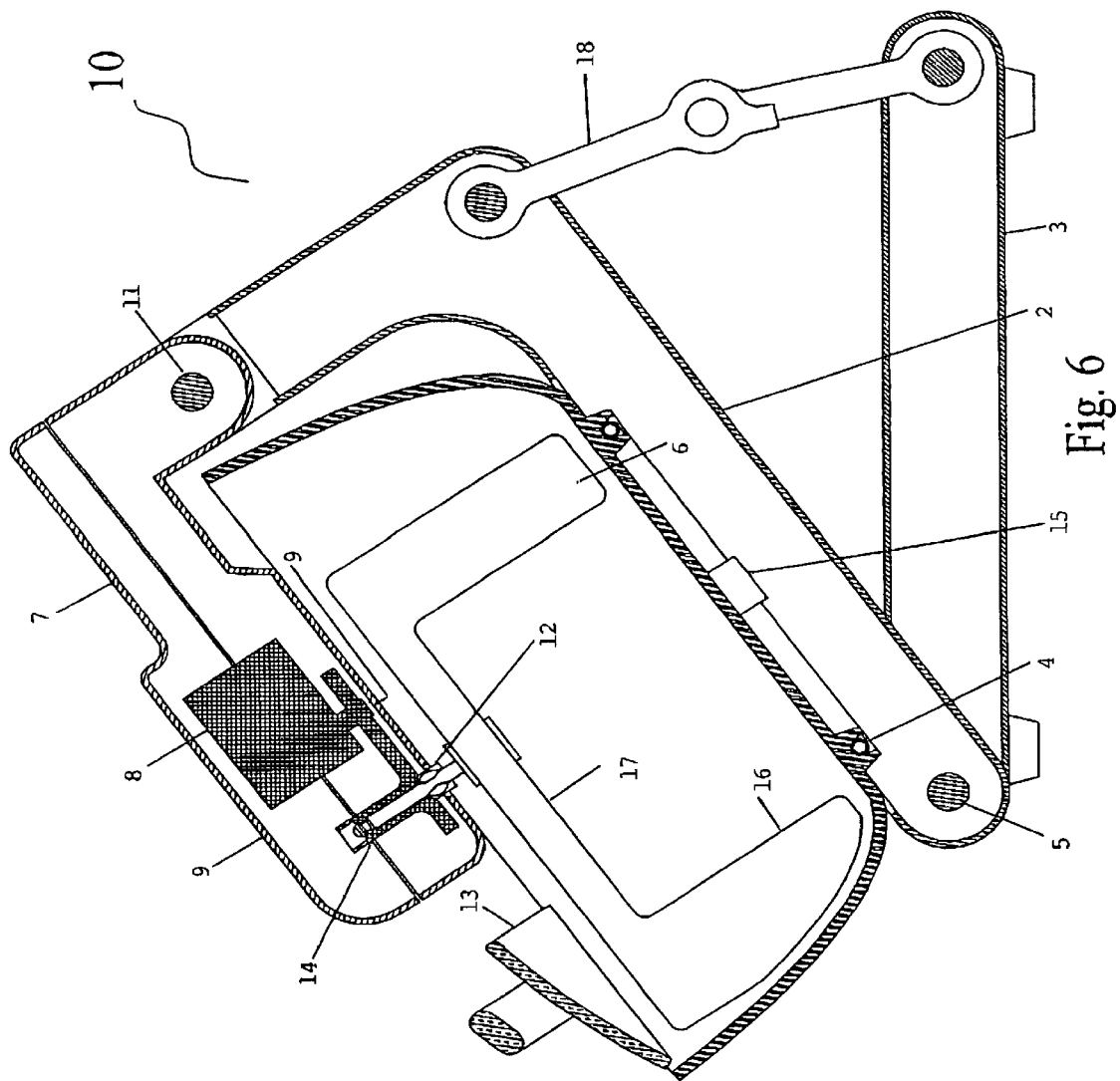
FIG. 6 is a schematic cross-sectional elevational view of a cooking appliance having it's cooking vessel positioned at an angle to the horizontal, with the stirring blade in the lowered (operating) position.

The lid 13 fits to the cooking vessel 1 in a position upon its rim that will be lower-most when the vessel 1 is tilted to the position depicted in FIGS. 5 and 6 to reduce the likelihood of ingredients ejecting outwardly when being cooked and stirred.

In one form of the appliance, the cooking vessel 1 and electric element 4 may be removable from the intermediate member 2 as an assembly, to enable washing in a sink or dishwasher.

The stirring blade as depicted comprises an arm 17 from which there depends a paddle 16, The stirring blade is typically of moulded plastics material. The paddle is configured to extend to a position within the vessel 1 almost immediately adjacent to the vessel sidewall and outer extremity of the vessel floor. In the embodiment depicted, there is a secondary paddle 6 located diametrically opposite paddle 16, but positioned closer to the quick-release coupling 12 than that paddle. Alternative forms of stirring blade can be used to enhance the stirring characteristics or efficiency for various styles of food.

In use, when the cooking vessel 1 is configured horizontally, the heater 4 and motor 8 are energised. Ingredients can then be added to the cooking vessel 1. Upon activation, the appliance will stir, tumble and heat the food until cancelled by the user or a pre-set program. This cooking method is for example ideal for cooking soups and sauces where constant stirring while cooking is required.

In another use, when the cooking vessel 1 can be inclined. The heater 4 and motor 8 can then be energised. Ingredients can then be added to the cooking vessel 1 and the appliance will stir and heat until cancelled by the user or a pre-set program. This cooking method is for example, ideal for cooking stir-fry where constant stirring and tumbling of the ingredients is required during cooking.

With cooking vessel 1 in the inclined position the stirring blade 6 pushes the food upwardly along the inclined floor of the cooking vessel 1 to a point where the ingredients release and tumble under the force of gravity to the lower area of the cooking vessel 1. The stirring blade 6 has one, two or more paddles 6 and 16 that can be strategically positioned or shaped so as to contact all of the ingredients within the cooking vessel 1. The stirring blade may have several arms 17 (or spokes) from which the paddles 16 can depend. The stirring blade is removable to allow cleaning and/or to allow fitting of other alternative stirring blades.

If the load on the stirring blade 6 is excessive the motor 8 will automatically reverse as a result of a load-sensing device (not shown) or by providing a synchronous motor that reverses automatically upon sensing overload.

Possible uses of the appliance with the cooking vessel in the horizontal position are to make sauces, soups, stews, beans, spaghetti, jams, scrambled eggs etc.

Possible uses of the appliance with the cooking vessel inclined at an angle to the horizontal position are to simulate stir-fry styles of Asian cooking where constant stirring and tumbling is required.

Advantages of using this appliance are:

unattended, it can be stirring and cooking some of the ingredient(s), while the user is preparing other ingredients that can be added while the cooking/stirring action continues and as required.

unattended, it can stir and cook many styles of food.

in the inclined mode it can tumble ingredients in a similar fashion to the manual action of stir-frying, where a spoon, spatula, chopstick or other similar cooking implement is used to stir the ingredients.

Figure 7:
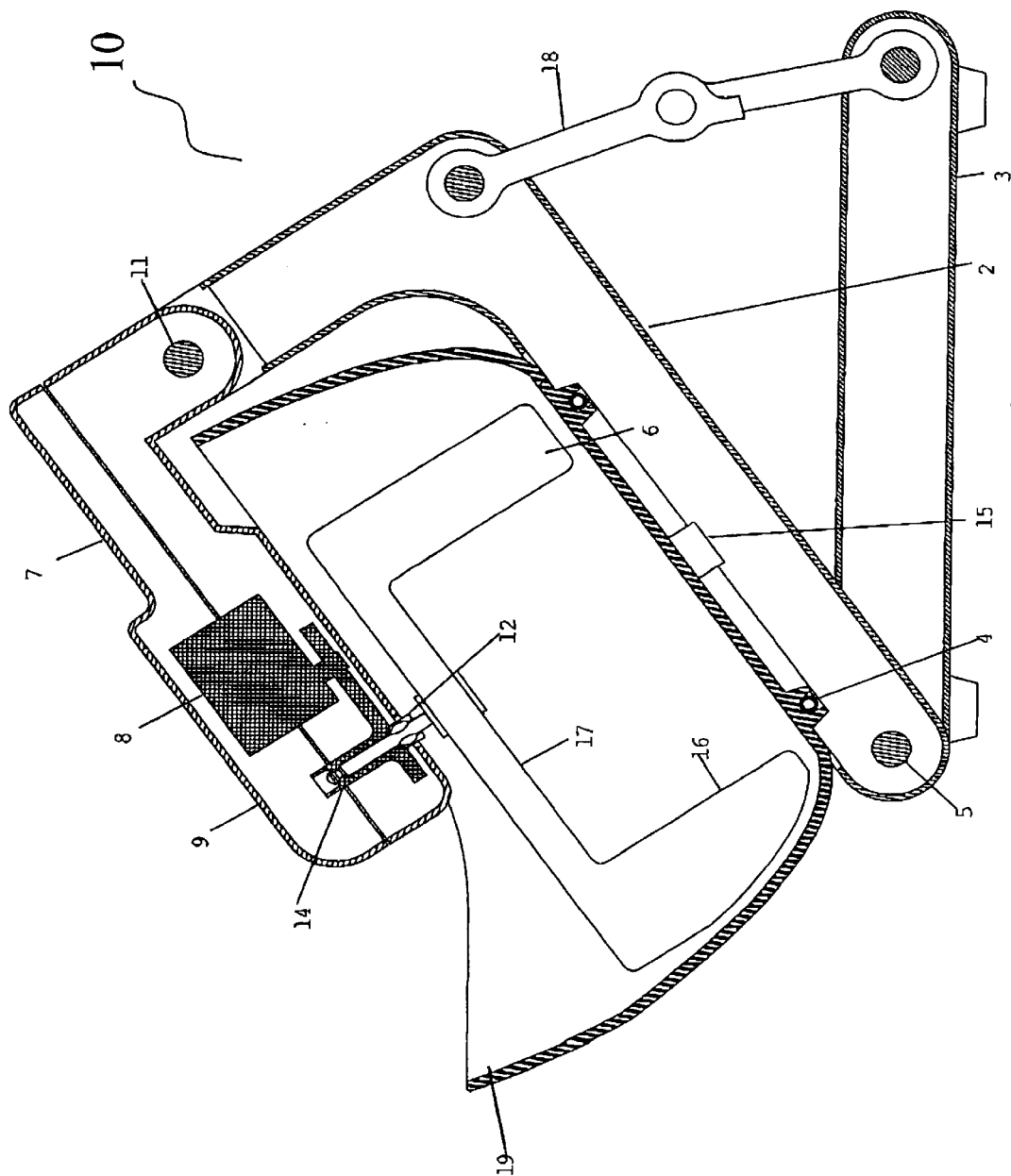
FIG. 7 is the same as FIG. 6 but shows an embodiment having a raised lip at one side instead of a lid.

It should be appreciated that modifications and alterations obvious to those skilled in the art are not to be considered as beyond the scope of the present invention. For example, instead of the stirring blade 16 rotating concentrically about the drive shaft, a gear, cam, linkage or other means might be added to provide a none uniform stirring motion. Furthermore, a raised lip as shown at 19 in FIG. 7 might be provided instead or as well as a lid.

I claim:

1. A cooking appliance comprising:

a base, an intermediate member mounted movably upon the base, a cooking vessel supported either directly or indirectly by the base, a heater for heating the cooking vessel, an arm mounted movably upon the intermediate member, stirring means extending from the arm to be received within the cooking vessel, wherein during heating of the cooking vessel by the heater and/or stirring of any contents therein by the stirring means, the cooking vessel can be in a tilted configuration supported by the intermediate member.

2. The appliance of claim 1 wherein the intermediate member is mounted pivotally to the base.

3. The appliance of claim 1 wherein the arm is attached pivotally to the intermediate member.

4. The appliance of claim 3 wherein the intermediate member and arm are configured to define a pivotal limit of the arm with respect to the intermediate member.

5. The appliance of claim 1 further comprising a linkage extending between the base and the intermediate member for maintaining the intermediate member in an inclined configuration when desired.

6. The appliance of claim 5 wherein the linkage is an over-center linkage.

7. The appliance of claim 5 further comprising a lid that partially or fully covers the cooking vessel.

8. The appliance of claim 7 wherein the lid is positioned upon a rim of the cooking vessel at a position that is lower-most when the vessel is tilted.

9. The appliance of claim 1 wherein the heater has associated with it a thermostatic switch to deactivate the heater upon reaching a pre-set temperature.

10. The appliance of claim 1 further comprising control means for governing operation of the motor and/or heater.

11. The appliance of claim 1 wherein the motor is mounted within the arm.

12. The appliance of claim 11 further comprising controls mounted on the arm.

13. The appliance of claim 4 wherein the stirring means comprises a stirring blade and the arm has two pivotal limits defined by a lock or detent at each pivotal extreme, one for cooking and another providing access to the stirring blade and to facilitate removal of the vessel.

14. The appliance of claim 4 wherein the stirring blade is attached to the arm by a quick-release drive coupling.

* * * * *